May 31, 1938.   J. L. STRATTON   2,119,406
ELECTRIC CIRCUIT CONTROL MEANS
Filed Sept. 14, 1935   2 Sheets-Sheet 1

Inventor:
Jerry L. Stratton,
by Harry E. Dunham
His Attorney.

May 31, 1938.  J. L. STRATTON  2,119,406

ELECTRIC CIRCUIT CONTROL MEANS

Filed Sept. 14, 1935   2 Sheets-Sheet 2

Inventor:
Jerry L. Stratton,
by Harry E Dunham
His Attorney.

Patented May 31, 1938

2,119,406

UNITED STATES PATENT OFFICE 2,119,406

ELECTRIC CIRCUIT CONTROL MEANS

Jerry L. Stratton, Schenectady, N. Y., assignor to General Electric Company, a corporation of New York Application September 14, 1935, Serial No. 40,622

3 Claims. (Cl. 171—229)

My invention relates to electric circuit control means, and more particularly to electric-tube means for controlling a power characteristic of an electric circuit or a dynamo-electric machine.

Heretofore, there have been proposed numerous electric circuit control means for alternating and direct current circuits. These prior arrangements when used to maintain a predetermined power characteristic of the alternating current circuits, frequently have required the use of numerous devices which due to the complex nature and the involved arrangements have been subject to inherent limitations as concerns the field of application and the precision of control and regulation obtained. In many instances, as in the case of systems using relatively high frequencies, it is desirable to maintain a predetermined power characteristic, and it is frequently desirable to accomplish this regulation in a comparatively short interval of time. This requirement necessitates the use of a relatively quick-acting system and one which is simple and reliable in operation.

An object of my invention is to provide an improved electric circuit control means for alternating and direct current circuits.

Another object of my invention is to provide an improved regulator and regulating system for alternating and direct current circuits.

Another object of my invention is to provide a system of power regulation for alternating and direct current circuits which is responsive to the rate of energy flow through the circuit to maintain the rate of energy flow at a predetermined value.

A further object of my invention is to provide a system of power regulation which is responsive to the rate of both positive and negative energy flow within alternating current circuits.

A still further object of my invention is to provide a power regulating system for dynamo-electric machines whereby the power output of the machines may be maintained constant or within predetermined limits.

For a better understanding of my invention, together with other and further objects thereof, reference is had to the following description taken in connection with the accompanying drawings, and its scope will be pointed out in the appended claims.

Figure 1:
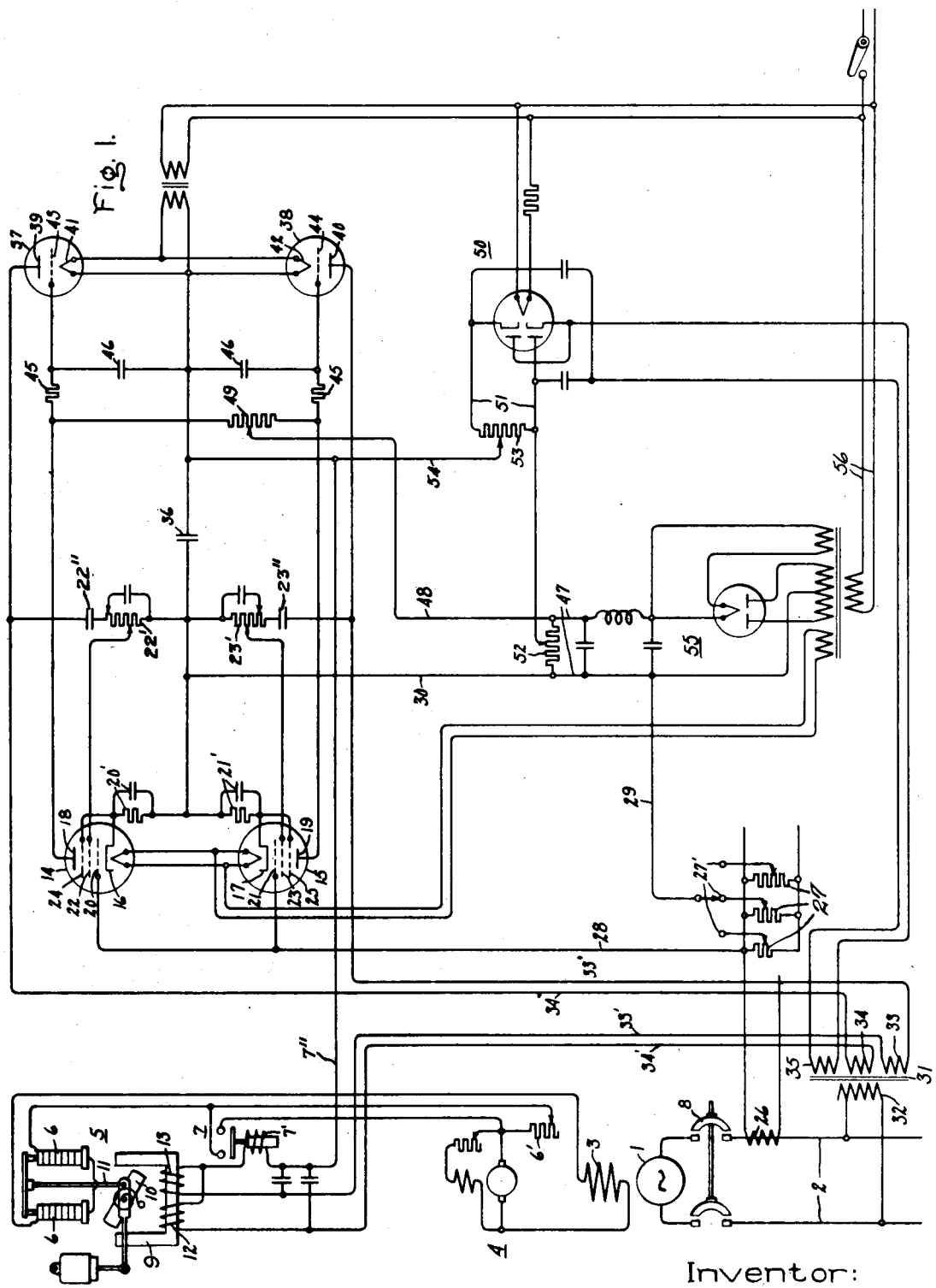
Figure 2:
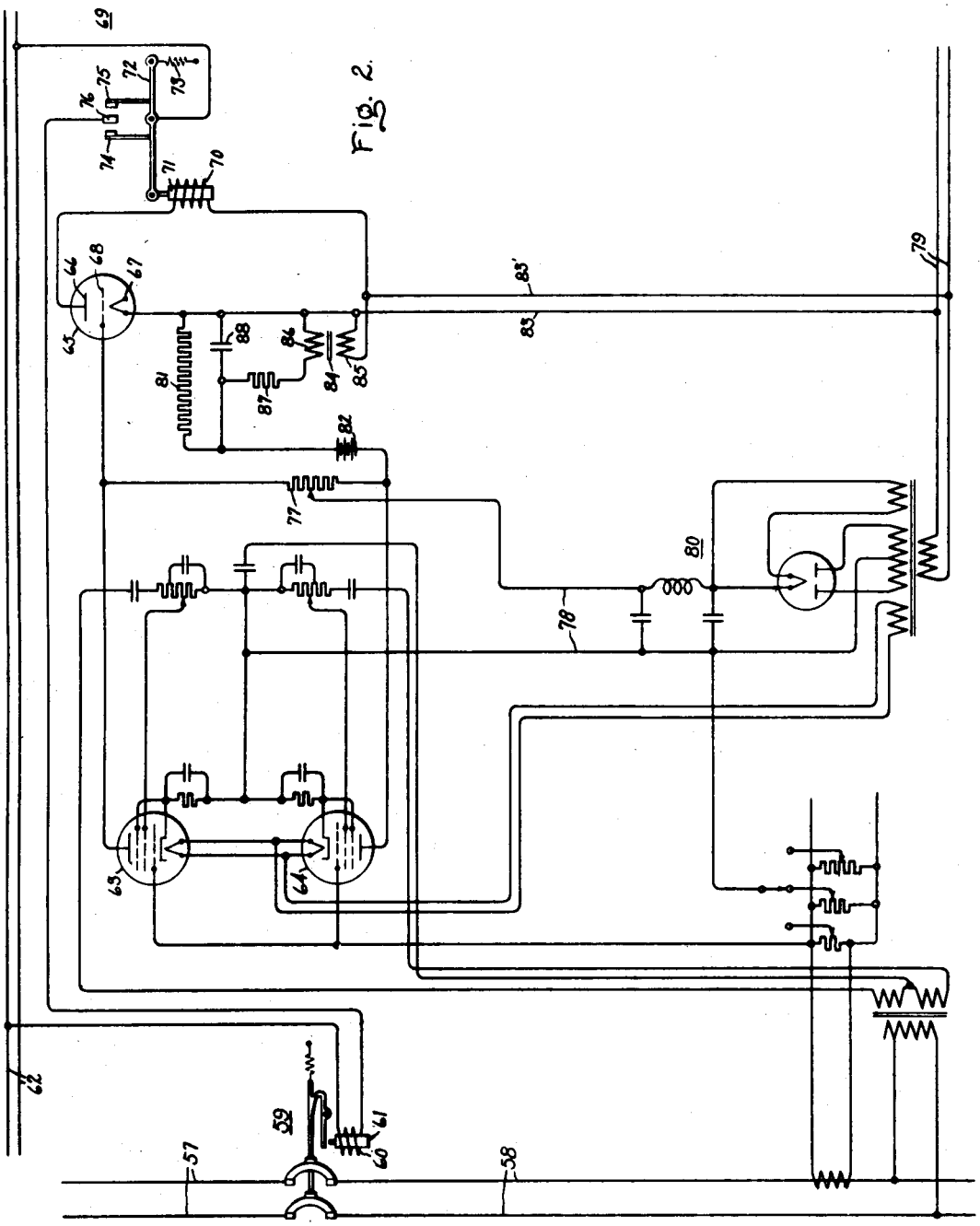

In the drawings Fig. 1 diagrammatically illustrates one embodiment of my invention as applied to an arrangement for maintaining a predetermined power characteristic of an electric circuit, and Fig. 2 diagrammatically represents a modified embodiment of my invention as applied to an arrangement for controlling an electric circuit in response to a predetermined power condition of an alternating current circuit and in response to the direction of energy flow therein.

Referring now to Figure 1 of the drawings, I have illustrated an arrangement embodying my invention for controlling the power supplied by an alternating current generator 1 to a load circuit 2. The generator 1 is provided with a field winding 3, which is energized by a self-excited exciter 4 through a direct-acting rheostatic regulator 5 having variable resistance elements 6 connected in series with the field winding 3. While any type of rheostat may be used, I have shown a variable resistance device of the type disclosed and claimed in co-pending patent application Serial No. 743,849 of Louis W. Thompson, filed September 12, 1934, and assigned to the assignee of the present application. It will also occur to those skilled in the art that other means, such as electronic-tube means now known in the art, may be used for energizing the field winding 3 without departing from my invention in its broader aspects. A no-load voltage adjusting rheostat 6' is provided to be inserted in series relation with variable resistance elements 6 and field winding 3 by means of relay 7 when the generator 1 is disconnected from load circuit 2 by switch 8. The rheostatic regulator 5 is illustrated as having a core member 9, an armature member 10 for actuating an arm 11 to effect movement of the variable resistance members 6, and differentially associated energizing windings 12 and 13.

To obtain an electric quantity proportional to the power characteristic of the circuit 2, I employ electric valves 14 and 15 of the type having cathodes 16 and 17, anodes 18 and 19, control grids 20 and 21, screen-grids 22 and 23, and suppressor grids 24 and 25, respectively. The general combination of valves of this type to obtain an electrical quantity proportional to the power of a circuit is disclosed and claimed in U. S. Patent No. 1,869,209 granted July 26, 1932 upon an application of Milton S. Mead, Jr., and assigned to the assignee of the present application. Excitation for the control grids 20 and 21 of electric valves 14 and 15 is obtained by means of a current transformer 26 connected in series with the load circuit 2 and resistance elements 27 connected across the output terminals of transformer 26. One terminal of the current transformer 26 is connected to the control grids through a conductor 28. Adjustable connections with taps 27' are provided on the resistance elements 27 and a connection is made from a selected tap to cathodes 16 and 17 by means of conductors 29 and 30. A number of resistance elements 27 of various values are provided to afford a means for controlling the magnitude of the voltage impressed upon the control grids 20 and 21. It will be apparent that by selecting resistances 27 of suitable values, I may adjust my arrangement to control various predetermined amounts of power. It will be understood that the potentials impressed upon control grids 20 and 21 will be in phase. Suitable means, such as resistance and capacitance circuits 20' and 21', may be used to impress a negative bias on the suppressor grids 24 and 25 of electric valves 14 and 15, respectively. An auxiliary source of direct current may be employed to obtain this bias if desired. To obtain electrical variations proportional to the voltage of circuit 2 for the excitation of screen-grids 22 and 23, I employ a transformer 31, having a primary winding 32, and secondary windings 33, 34 and 35. The upper terminal of transformer winding 34, as viewed in the drawings turned on its side, and the lower terminal of windings 33 are connected to screen-grids 22 and 23, respectively, through blocking capacitances 22" and 23", and resistances 22' and 23' respectively. The resistances 22' and 23' are provided with adjustable taps or terminals to permit adjustment of the magnitude of the voltage impressed upon the respective screen-grids. The suppressor grids 24 and 25 of electric valves 14 and 15, respectively, are arranged to have a potential substantially the same as that of the cathode. However, it will be well understood by those skilled in the art that the suppressor grids may be connected to have any potential less positive than the respective anodes to obtain the desired output characteristic of the respective electric valves. The other terminals of the transformer windings 34 and 33 are connected through conductors 34' and 33' to the left-hand terminals of differential windings 12 and 13 of the rheostatic regulator 5. The right-hand terminals of the windings 12 and 13 are connected through conductor 7" to the cathodes of electric valves 14 and 15 through a blocking condenser 36.

To provide a means for amplifying the output currents of electric valves 14 and 15, I employ electric valves 37 and 38 having anodes 39 and 40, cathodes 41 and 42, and control electrodes 43 and 44, respectively. The anode circuits of valves 14 and 15 are connected through resistances 45 to the control electrodes 43 and 44, respectively. The conventional grid biasing capacitances 46 are connected between the respective cathodes and control electrodes. An auxiliary source of direct current 47 is provided, by means of a full-wave rectifier and filter circuit 55 energized from any suitable alternating current source illustrated as an auxiliary alternating current supply circuit 56, to apply a positive potential between the respective anodes and cathodes of electric valves 14 and 15. The negative terminal of this auxiliary supply is connected through conductor 30 to the cathodes of electric valves 14 and 15 and the positive terminal is connected through conductor 48 to the mid-point of resistance 49 which is connected between the anodes of valves 14 and 15. Since the electric valves 14 and 15 are so arranged that they operate to furnish an electrical quantity proportional to a desired function of the current and the voltage of circuit 2, and since the anode potentials of the amplifying valves 37 and 38 are also proportional to the voltage of circuit 2, it is desirable to control the voltages impressed upon the respective control electrodes of these valves to compensate for variations in the anode potentials in order to maintain the desired electrical quantity provided by valves 14 and 15. To provide a compensating means I employ an arrangement 50 energized from winding 35 of transformer 31. This voltage-doubling rectifier 50 is of the conventional type and is used to provide a source of direct current across terminals 51 which automatically varies with changes in the potential of the circuit 2. By means of adjustable taps of resistances 52 and 53, the bias necessary to maintain a predetermined amplification may be impressed upon control electrodes 43 and 44 of electric valves 37 and 38, respectively, through conductors 48 and 54. It will be understood that this compensating circuit arrangement is used in the illustrated embodiment because the anode voltages for the amplifying valves 37 and 38 are obtained from the source 2, the voltage of which is variable since the power output of the generator is being regulated. If, however, a source of constant voltage were used as the energizing source for the amplifying valves 37 and 38, it would be obvious that such a compensating arrangement would not be necessary.

The operation of the power regulator may be best understood by considering the arrangement when the alternator 1 is supplying energy to the load circuit 2 being inductance and resistance, the switch 8 being closed and the relay 7 being energized to short circuit the no-load voltage adjusting rheostat 6'. Under these conditions the field excitation of the alternator, and hence the voltage of the alternator, will be controlled by the power regulator arrangement to maintain a predetermined power output of the alternator 1. A positive potential is continually impressed upon the respective anodes of valves 14 and 15 by direct current source 47 through resistance 49. Electric valves 14 and 15, by virtue of the inherent characteristics of this type of valve which may have a screen-grid and a control grid, will be rendered conductive when the potential impressed upon the screen-grid is positive even though the potential of the control grid may be negative. As long as the potential of the control grid does not exceed a critical negative potential, the screen-grid will be effective to render this type of valve conductive or non-conductive. In this particular embodiment of my invention, the circuit is arranged so that the potential of the control grid does not fall below this critical value. In the operation of such an arrangement, a decrease in the negative bias on the control grid, with the anode and the screen-grid at potentials positive relative to the cathode, will be effective to increase the anode voltage. Let it be assumed that the potential of the lower terminal of winding 33 of transformer 31 is such that the potential of screen-grid 23 of electric valve 15 is positive relative to the associated cathode 17. At this point in the cycle of operation a negative potential will be impressed upon screen-grid 22 of electric valve 14. In other words, the control grids 20 and 21 of electric valves 14 and 15, respectively, are connected so that the potentials impressed upon them are in phase and the screen-grids are connected so that the potentials impressed upon them are 180 electrical degrees out of phase. During that part of a half cycle in which the voltage impressed upon the screen-grid 23 is positive, electric valve 15 will be conductive. If the load being supplied is inductive so that the current lags the voltage, it will be apparent that the potential will reverse in polarity before the current, in which case the potential impressed upon the screen-grid 23 will be reversed in polarity and valve 15 will be rendered non-conductive. However, since the potential impressed upon screen-grid 22 of electric valve 14 is 180 degrees out of phase with the potential impressed upon screen-grid 23 of valve 15, the electric valve 14 will be rendered conductive at this particular point and will remain conductive so long as the potential of the screen-grid 22 remains positive relative to cathode 16. As soon as the current reverses polarity the potential of control grid 20 will become more negative relative to the cathode and the current conducted through electric valve 14 will be reduced to a relatively small value during the remaining part of the negative half cycle. It will, therefore, be apparent to those skilled in the art that under the conditions assumed, electric valve 15 will furnish an anode current, a component of which is proportional to a function of the positive current and the positive voltage of circuit 2, and valve 14 will furnish an anode current a component of which is a function of the positive current and the negative voltage of circuit 2. In other words, the output or anode current of electric valve 15 is proportional to the positive volt-amperes or the positive power characteristic of alternating current circuit 2, and the output or anode current of electric valve 14 is proportional to the negative volt-amperes or the negative power characteristic of alternating current circuit 2. The difference in the anode currents of electric valves 14 and 15 is, of course, proportional to the true power or the watts of alternating current circuit 2. Electric valve 38 will amplify the output current of valve 15, resulting in the energization of winding 13 of the rheostatic regulator 5. The circuit through which the output current flows is from cathode 42 through conductor 7", relay winding 7', winding 13 of rheostatic regulator 5, conductor 33', transformer winding 33 and conductor 33" to anode 40 of valve 38. Similarly, the output current of electric valve 14 will be amplified by electric valve 37, and the output current of valve 37 will flow through the following circuit from cathode 41, conductor 7", relay winding 7', winding 12, conductor 34', transformer winding 34 and conductor 34" to anode 39 of valve 37. Variations in the anode potentials of valves 37 and 38 will be compensated for by concomitant variations in the grid bias occasioned by variations in the voltage of source 51 of the voltage compensating circuit 50.

Let it be assumed that the true power output of generator 1 exceeds the amount which the power regulating system is adjusted to maintain, and let it be assumed further that the electric valve 15 is conductive by virtue of the screen-grid 23, being positive relative to the cathode 17. During this part of the cycle the output current or anode current of valve 15 will increase, resulting in an increase in the voltage impressed upon control electrode 44 of valve 38, thereby causing an increase in the output current of amplifying valve 38. This increased current flowing through winding 13 of the rheostatic regulator 5 will cause an increase in the flux in core member 9 tending to rotate the armature 10 in a counterclockwise direction, resulting in an upward movement of arm 11 and occasioning an increase in the effective resistance of the variable resistance elements 6. The current through the generator field winding 3 will be decreased, accomplishing thereby a reduction in generated voltage and thus a reduction in power output. For the purpose of simplicity, the effect of only one coil or energizing winding of the rheostatic relay has been considered. It will be readily understood that since the electric valve 15 furnishes a current proportional to the positive volt-amperes of circuit 2, and further since electric valve 14 furnishes a current proportional to the negative volt-amperes of circuit 2, the differential effect of these two currents may be utilized to obtain regulation responsive to the true power supplied to the circuit 2. The rheostatic relay is adjusted to control variable resistance elements 6 to maintain the desired power output of generator 1. In other words, the rheostatic regulator 5, which is responsive to the differential effect of windings 12 and 13, and hence responsive to the true power, is adjusted to control the effective resistance of elements 6 and to maintain constant the power output of generator 1. It will, therefore, be understood that during each cycle valve 15 will furnish one pulse of current to winding 13, and valve 14 will furnish one pulse of current to winding 12. If the true power supplied by the generator 1 to circuit 2 increases, the increased energization of winding 13 will cause the armature 10 to rotate in a counterclockwise direction to cause an increase in the effective resistance of elements 6 and a resultant decrease in generator voltage and output. If the true power output of the generator falls below the value to be maintained, the reverse operation will take place resulting in a decrease in the effective resistance of elements 6 and consequently resulting in an increase in generator voltage and output. If it be assumed that there is a variation in the lagging quadrature current supplied to circuit 2, and if it be assumed that the voltage of the alternator remains constant, there will be a variation in the energization of the individual windings 12 and 13 of the rheostatic relay 5, but the net energization or the differential effect of the windings will remain substantially the same, so that there will be no variation in the excitation of the field winding 3 of generator 1 and the true power output of the generator will remain substantially the same.

Although there has been shown, in the particular embodiment of my invention illustrated in Fig. 1, an arrangement including electric valves 37 and 38 for amplifying the output currents of valves 14 and 15, it will readily occur to those skilled in the art that I may energize the windings 12 and 13 of the rheostatic relay directly from electric valves 14 and 15, in which case the amplifying valves 37 and 38 and the voltage compensating circuit 50 will not be necessary. It will also occur to those skilled in the art that my power regulator may be readily modified without departing from my invention in its broader aspects to maintain any one of a variety of power conditions in an alternating current circuit or in a direct current circuit.

In Fig. 2 there is represented diagrammatically another embodiment of my invention as applied to a system for controlling alternating current circuits in response to the magnitude and direction of power transfer. An alternating current load circuit 57 is energized from an alternating current supply circuit 58 through a switching means 59 having tripping means indicated by an actuating coil 60 and a plunger 61. The coil 60 may be energized from any suitable alternating or direct current source such as circuit 62. The switching means 59 may be arranged to disconnect the supply circuit 58 from the load circuit 57 in response to predetermined power conditions obtaining in the supply circuit. An arrangement of electric valves 63 and 64 and associated excitation means similar to that described in connec-

average output current of electric valve 64 exceeds the average output current of electric valve 63, the potential drop across the resistance 77 will be in the opposite direction to the voltage of the source of direct current 82. This condition will result in a decrease in the negative bias voltage impressed upon the control electrode 68. On the other hand, when the circuit 57 supplies energy to circuit 58, the average output current of electric valve 63 will exceed the average output current of electric valve 64. Under these conditions, the potential drop across the resistance 77 will be in the same direction as the potential of source 82, thereby increasing the negative bias voltage impressed upon the control electrode 68 of valve 65.

If it be assumed that the circuit 57 is supplying energy to circuit 58 or, in other words, that there has been a reversal in the direction of energy flow between these circuits, the potential drop across resistance 77 will be in the same direction as the voltage drop across resistance 73 causing thereby an increase in the negative bias impressed upon control electrode 68 and a consequent decrease in the output current of electric valve 65. It will be readily understood that upon reversal of direction of energy flow between circuits 57 and 58, the output current of electric valve 65 will be reduced to a relatively small value by virtue of the increase in the negative grid bias. Due to the reduction in the energization of coil 70 of current relay 69, the pivoted arm 72 will be rotated in a clockwise direction by spring 73 to cause the engagement of movable contact 74 with stationary contact 76, thereby effecting energization of actuating coil 60 of switching means 59 and disconnection of circuit 57 from circuit 58.

While I have shown and particularly described certain embodiments of my invention for the purpose of explaining its principle and showing its application, it will be obvious to those skilled in the art that many modifications are possible without departing from my invention in its broader aspects, and I aim, in the appended claims, to cover all such modifications and variations as fall within the true spirit and scope of my invention.

What I claim as new and desire to secure by Letters Patent of the United States, is:

1. In combination, a dynamo-electric machine having an armature winding, a field winding, a rheostatic regulator and an exciter for energizing said field winding through said regulator, power responsive means including two electric valves each comprising an anode, a cathode and at least two control electrodes, means for impressing upon corresponding control electrodes of each valve in-phase potentials proportional to the current in said armature winding and for impressing upon the other corresponding control electrodes of each valve potentials proportional to the voltage of said armature winding and displaced relative to each other 180 electrical degrees, one of said valves being connected to provide an average anode current proportional to the positive power characteristic of said armature winding and the other of said valves being connected to provide an average anode current proportional to the negative power characteristic of said armature winding, said rheostatic regulator being differentially responsive to the currents provided by said electric valves to control the energization of said field winding to maintain a predetermined power output of said dynamo-electric machine.

2. In combination, an alternating current generator having a field winding and an armature winding and a rheostatic regulator in the field circuit, an alternating current circuit energized by said generator, an exciter for energizing said field winding through said rheostatic regulator, a power responsive device including two electric valves each comprising an anode, a cathode and at least two control electrodes, means for impressing upon corresponding control electrodes of each valve in-phase potentials proportional to the current in said armature winding and for impressing upon the other corresponding control electrodes of each valve potentials proportional to the voltage of said armature winding and displaced relative to each other 180 electrical degrees, one of said valves being connected to provide an anode current proportional to the positive power characteristic of said alternating current generator and the other of said valves being connected to provide an anode current proportional to the negative power characteristic of the alternating current circuit, said rheostatic regulator being provided with two differential actuating elements arranged to be energized respectively by said anode currents and arranged to control the resistance of said rheostatic regulator to maintain a constant power output of said alternating current generator to said alternating current circuit.

3. In combination, an alternating current circuit, a dynamo-electric machine having a field winding connected to said alternating current circuit, an exciter for energizing said field winding through a rheostatic regulator, a power responsive device including two electric valves each comprising an anode, a cathode, a control electrode, a screen-grid and a suppressor grid, means comprising a current transformer and a resistance for impressing upon said control electrode of each of said valves in-phase potentials proportional to the current of said alternating current circuit, means comprising a potential transformer for impressing upon the screen-grid of each of said valves potentials proportional to the voltage of said alternating current circuit and displaced relative to each other 180 electrical degrees, means for impressing upon the suppressor grid of each of said valves a potential less positive than the associated anode, one of said valves being connected to provide an anode current proportional to the positive power characteristic of said alternating current circuit and the other of said valves being connected to provide an anode current proportional to the negative power characteristic of said alternating current circuit, means for amplifying the anode currents of the first-mentioned valves comprising two electric valves each comprising an anode, a cathode and a control electrode, an auxiliary source of direct current for impressing upon the anodes of the first-mentioned electric valve a positive potential relative to the associated cathodes, means for controlling the potential of the control electrodes of said second-mentioned valves to compensate for variations in the potentials impressed upon the anodes of said second-mentioned valves, and means responsive to the output currents of said amplifying means for actuating said rheostatic regulator to maintain a predetermined power characteristic of said alternating current circuit.

JERRY L. STRATTON.